United States Patent

Freese, V

[11] Patent Number: 6,116,026
[45] Date of Patent: Sep. 12, 2000

[54] ENGINE AIR INTAKE MANIFOLD HAVING BUILT-IN INTERCOOLER

[75] Inventor: Charles E. Freese, V, Westland, Mich.

[73] Assignee: Detroit Diesel Corporation, Detroit, Mich.

[21] Appl. No.: 09/215,360

[22] Filed: Dec. 18, 1998

[51] Int. Cl.[7] .................................................. F02B 33/44
[52] U.S. Cl. ................................ 60/605.2; 123/568.12; 123/568.18
[58] Field of Search ................... 123/568.12, 568.18, 123/563; 60/599, 605.2

[56] References Cited

U.S. PATENT DOCUMENTS

| | | | |
|---|---|---|---|
| 2,551,307 | 5/1951 | Yingling | 123/563 |
| 3,881,455 | 5/1975 | Belsanti | 123/563 |
| 3,996,748 | 12/1976 | Melchior | 60/605.2 |
| 4,028,892 | 6/1977 | Hinkle | 60/599 |
| 5,494,211 | 2/1996 | Ragan | 236/34.5 |

*Primary Examiner*—Noah P. Kamen
*Attorney, Agent, or Firm*—Bill C. Panagos

[57] ABSTRACT

A turbocharged V type engine can be equipped with an exhaust gas recirculation cooler integrated into the intake manifold, so as to achieve efficiency, cost reductions and space economization improvements. The cooler can take the form of a tube-shell heat exchanger that utilizes a cylindrical chamber in the air intake manifold as the heat exchanger housing. The intake manifold depends into the central space formed by the two banks of cylinders on the V type engine, such that the central space is effectively utilized for containing the manifold and cooler.

13 Claims, 2 Drawing Sheets

ENGINE AIR INTAKE MANIFOLD HAVING BUILT-IN INTERCOOLER

BACKGROUND OF THE INVENTION

This invention relates to an engine air intake manifold, and particularly to an intake manifold having an intercooler supported within a cavity formed in the manifold.

This invention further relates to an engine air intake manifold having an intake manifold and an exhaust gas recirculation (EGR) cooler supported within a cavity formed in the manifold.

Some diesel engines employ turbocharger systems and exhaust gas recirculation in order to meet performance, fuel economy, and emission requirements. Typically exhaust gas recirculation is used during low to mid speeds, and while the engine is under partial load. Exhaust gas recirculation is often controlled by an electronically actuated exhaust gas recirculation valve located between the exhaust manifold and the intake manifold.

In some cases an exhaust recirculation gas cooler (intercooler) is added to lower exhaust gas temperatures for enhanced oxides of nitrogen (NO,) reduction. The exhaust gas cooler may be located either upstream or downstream from the exhaust gas recirculation valve. Engine coolant can be used in the cooler to cool the recirculating exhaust gas.

SUMMARY OF THE INVENTION

The present invention incorporates the exhaust gas recirculation cooler into the intake manifold. Exhaust gas recirculation passages are integrated into the intake manifold and cylinder heads to eliminate external exhaust gas recirculation passages. In a preferred embodiment of the invention, the air intake manifold has two side extensions that form covers for the valve-actuation rocker arms. This arrangement eliminates the need for separate rocker arm compartment covers.

The invention achieves some cost reductions when used on turbocharged V configuration internal combustion engines. Various housings, brackets, clamps, tubes, seals, fasteners, and gaskets are eliminated, resulting in some savings as regards materials and installation expenses.

Additionally, the location of the cooler and exhaust gas recirculation valve within the intake manifold minimizes noise transmission to the surrounding environment, since the gas passages are buried within the manifold and are insulated by water jackets which dampen sound energy. The gas passage system is somewhat simplified so that adequate gas flow rates can be achieved without excessive pressure losses.

In preferred practice of the invention a venturi system is provided in the intake manifold for assimilating the recirculating exhaust gases into the airstream flowing into the intake manifold. The venturi system promotes a high gas flow rate for enhancing the NO, reduction performance of the system.

Further features of the invention will be apparent from the attached drawings and description of an illustrative embodiment of the invention.

DESCRIPTION OF A PREFERRED EMBODIMENT OF THE INVENTION

Figure 1:
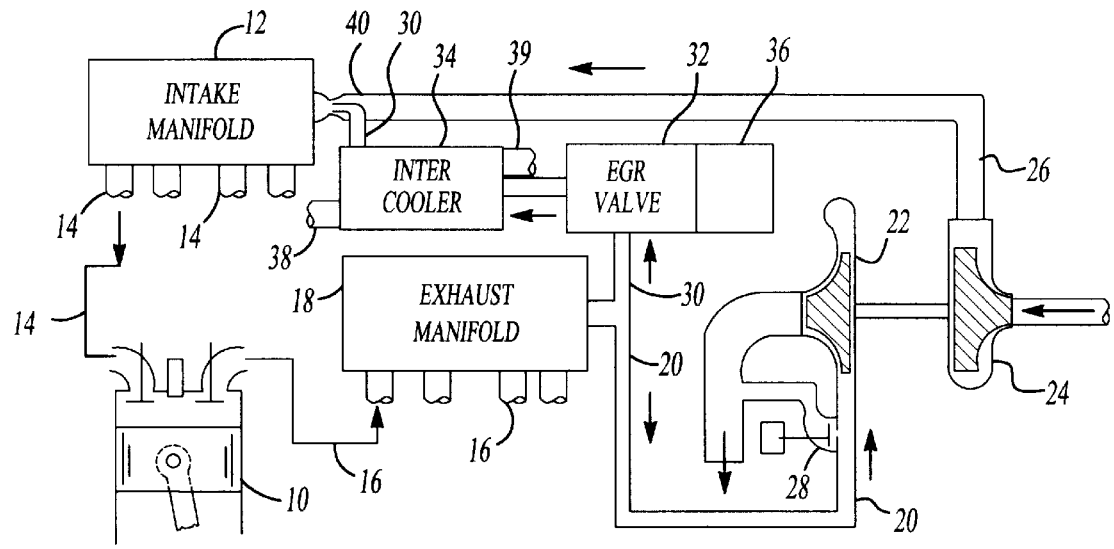
FIG. 1 is a schematic representation of an engine exhaust gas recirculation system that can employ the present invention.

Referring to FIG. 1, there is schematically shown a diesel engine equipped with a turbocharger and an exhaust gas recirculation system. The engine comprises a plurality of engine cylinders 10 supplied with combustion air from an air intake manifold 12 and air intake passages 14. Exhaust gases are directed through exhaust passages 16 to an exhaust manifold 18.

At least some of the exhaust gas travels through passage 20 to a turbocharger turbine 22. The turbine impeller is driven by the fast-flowing gases to drive the impeller of compressor 24. Incoming air pressure in air line 26 is thereby boosted to increase the air flow into intake manifold 12.

A waste gate relief valve 28 is provided to limit the amount of pressure boost in air line 26. The waste gate 28, when open, dumps some (or all) of the exhaust gas flowing through passage 20 bypassing turbine 22, thereby reducing the turbine impeller speed and the pressure boost provided by compressor 24.

Some of the exhaust gas flowing out of exhaust manifold 18 is recirculated back to the intake manifold 12 via a gas recirculation passage 30. The recirculation gas passes through an exhaust gas recirculation valve 32 and intercooler 34. An electronic actuator 36, responsive to engine load and speed, and other engine variables, controls gas recirculation valve 32. The intercooler 34 can be a tube-shell heat exchanger, wherein the hot exhaust gases flow through the tubes and coolant flows through the shell around the tubes. The coolant can be liquid engine coolant flowing into/out of the heat exchanger through tubes 38 and 39. Gas recirculaiton passage 30 connects with air line 26 via a non-restrictive connection 40 that can include a venturi designed so that air flowing through line 26 draws the recirculating gas into the air stream with at least some turbulence to allow mixing for a substantially uniform and homogeneous fuel/air mixture, and minimum pressure loss.

Figure 2:
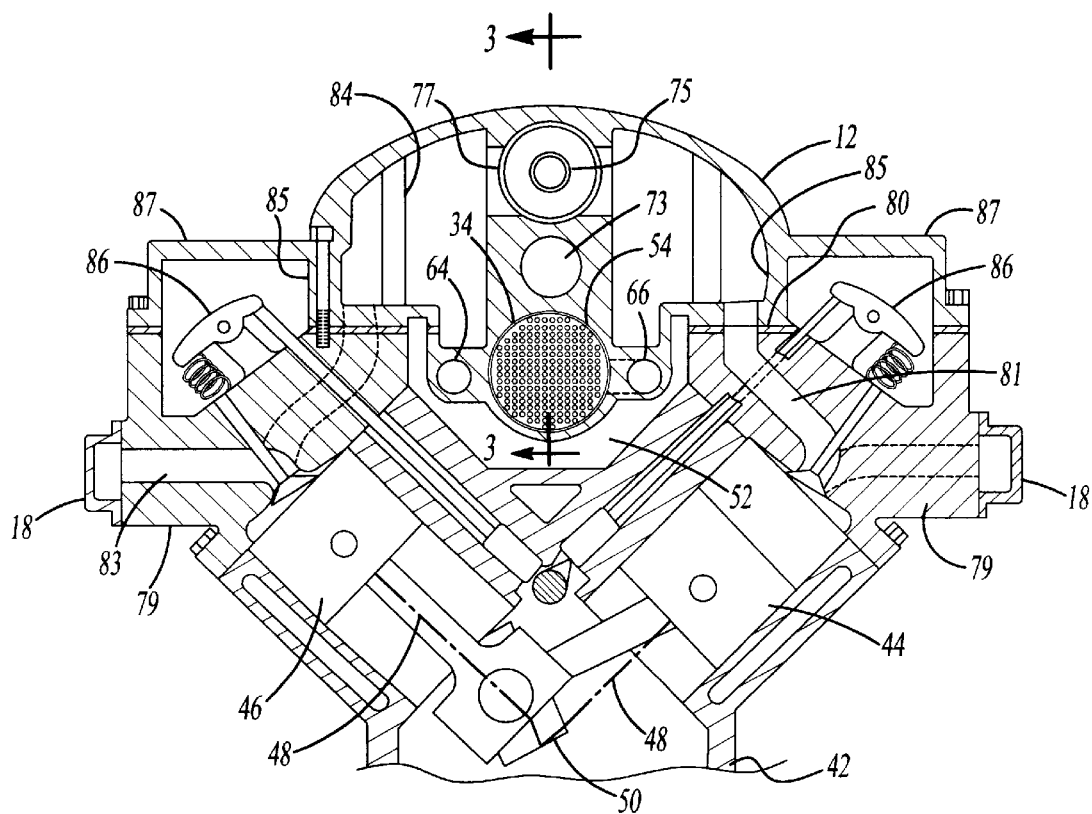
FIG. 2 is a sectional view of a V-type engine embodying the invention, taken on line 2—2 in FIG. 3
Figure 3:
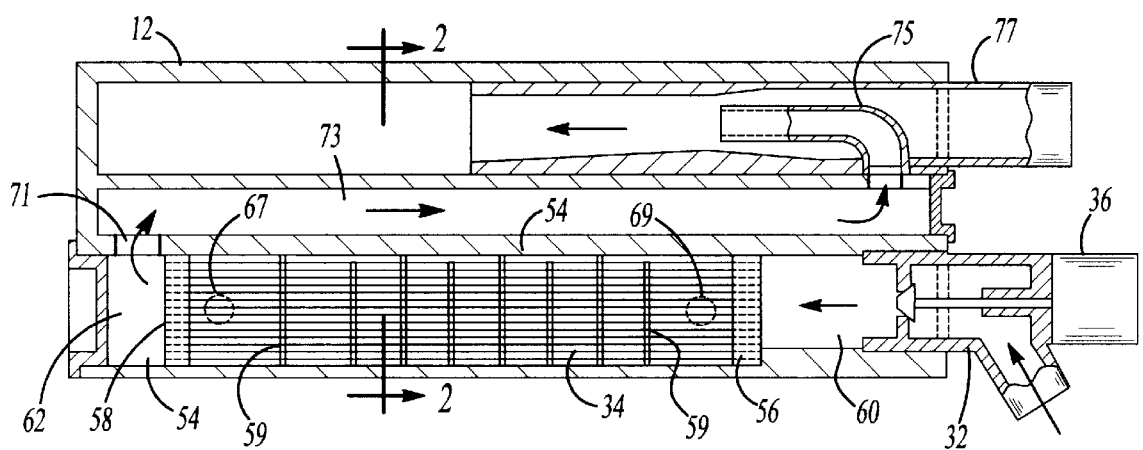
FIG. 3 is a longitudinal sectional view taken along line 3—3 of FIG. 2 showing an intake manifold employed in the FIG. 2 engine.

The present invention involves constructing the system of FIG. 1 so that intercooler 34 and gas recirculation valve 32 are physically located within intake manifold 12. The physical arrangement economizes on space, while at the same time simplifying some of the fluid connections that are required between the operating components. FIGS. 2 and 3 illustrate one way in which the invention can be practiced.

FIG. 2 shows a turbocharged V configuration internal combustion engine 42 having first and second banks of cylinders 44 and 46 arranged so that the cylinder axes 48 in the respective banks intersect at a point 50. The cylinder axes are acutely angled to each other so that a central space 52 is formed above the axes intersection point 50. The engine air intake manifold 12 is located in central space 52.

Manifold 12 comprises an elongated cylindrical chamber 54 that accommodates a heat exchange tube bundle 34. Tube bundle 34 cooperates with the wall of chamber 54 to form an intercooler for the recirculating exhaust gas. Those skilled in the art will understand that a similar strategy may be used for an air-to-water charge air cooler on engines which do not use Engine Gas Recirculation (EGR). For purposes of coordinating FIGS. 2 and 3 with FIG. 1, numeral 34 is applied to the tube bundle in FIG. 2 and 3.

As shown in FIG. 3, tube bundle 34 comprises headers 56 and 58 conforming to the chamber 54 surface, and plural baffles 59 spaced along the heat exchange tubes for baffling the flow of coolant around the tubes. Exhaust gas flows from an inlet chamber 60 through the heat exchange tubes to an exit chamber 62.

Referring to FIG. 2, two engine coolant passages 64 and 66 are formed alongside chamber 54 for circulating liquid coolant around the heat exchange tubes. Each coolant passage can be provided with a tubular end fitting at the right (rear) end of the manifold for connecting the respective passage to suitable coolant hoses. Coolant passages 64 and 66 are connected to chamber 54 via holes 67 and 69 in the chamber 54 wall.

Liquid coolant flow through the intercooler is generally countercurrent to the gas flow. Liquid supplied to passage 64 flows through hole 67 into the space surrounding the tubes. Liquid flows from chamber 54 through hole 69 into passage 66.

Tube bundle 34 is mounted so that header 56 is secured to the chamber 54 wall, while header 58 is slideable on the chamber 54 surface (for thermal expansion stress relief). Header 58 has one or more "O" ring peripheral seals to prevent coolant leakage.

A suitable exhaust gas recirculation valve cartridge 32 is mounted in the rear (right) end of chamber 54 for modulating the flow of exhaust gas into inlet space 60. The use of a cartridge eliminates the need for a separate valve housing, while at the same time reducing overall space requirements.

The cooled exhaust gas flows out of exit space 62 though a transverse hole 71 into an elongated gas passage 73 extending above chamber 54. Passage 73 communicates with a suction tube 75 that is carried by a venturi tube 77 extending into the right (rear) end of the manifold housing. The exposed end of tube 77 connects to the aforementioned air line 26 (FIG. 1), whereby the incoming air flows across suction tube 75 to draw recirculating exhaust gas into the air flowing though manifold 12 to the engine cylinders.

Venturi tube 77 may be a cartridge formed separately from the manifold so as to serve as a connector for air line 26 and also as a mechanism for assimilating the recirculation exhaust gas into the incoming air stream, with optimal turbulence for producing the proper air/fuel gas mixture.

Each bank of cylinders 44 or 46 includes a cylinder head 79 having air intake passage 81 and gas exhaust passages 83 communicating with the various cylinders, as shown in FIG. 2. Each cylinder head has a flat upper surface 80 adapted to mate with a flat mounting face on intake manifold 12, whereby the manifold is jointly supported by the two cylinder heads. Air openings in the mounting faces of the manifold align with the air intake passages 81 in the respective cylinder heads, whereby combustion air is admitted to intake valves in the cylinder heads.

Manifold 12 is bolted to cylinder heads 79 by two individual sets of bolts located around the edge area of each cylinder head. Hollow tubular bosses 84 can be formed at spaced points along the manifold to accommodate some of the mounting bolts. The manifold side walls 85 can be provided with suitable holes to accommodate other mounting bolts. Suitable gaskets are provided on the upper surfaces 80 of the cylinder heads.

Upper surfaces 80 in the cylinder heads are located in a common horizontal plane, such that all of the mounting bolts for intake manifold 12 can be oriented vertically. The bolts expand or contract in unison to accommodate thermal expansion of the manifold, without generating undesired stresses in the manifold walls.

Each bank of cylinders 44 or 46 has conventional rocker arms 86 for operating the intake and exhaust valves in the cylinder heads 79. Manifold 12 has two side extensions 87 that form covers for the rocker arms. This feature eliminates the need for separate covers for the rocker arms.

A principal feature of the invention is the integration of the intercooler 34 and exhaust gas recirculation valve 32 into the intake manifold. Internal chamber 54 within the intake manifold forms the housing for the intercooler. Gas recirculation valve 32 and venturi 77 are cartridge structures that can fit within the manifold to obviate the need for separate housings or mounting devices. The invention provides a structural simplification of the gas recirculation sub-system used in high performance, low emission, V configuration diesel engines. An incidental benefit is space economization in the engine compartment. Because the engine cooling system is linked to the manifold cooling passages, the cooling system thermostat may be integrated into the manifold. Thus, the thermostat housing 41 may be shown in FIG. 1, as an interger part of the intake manifold. This construction eliminates the need for a separate thermostat housing for an engine system cost reduction. Heat from the intercooler may be used to supplement vehicle cabin heating and to assist engine warm-up for emissions control.

It will be appreciated that the illustrated structural arrangement is representative of the invention, and that the manifold-cooler assembly can be constructed in various ways while still practicing the invention.

What is claimed:

1. A turbocharged V configuration internal combustion engine having first and second banks of cylinders arranged so that the cylinder axes in the respective banks intersect at an acute angle, further comprising a turbocharger that includes a turbine driven by the exhaust eases from said cylinders and a compressor driven by said turbine, an exhaust manifold for delivering exhaust gases from said cylinders to said turbine, and a gas recirculation passage comprised of an exhaust gas recirculation valve located in said intake manifold for bypassing some of the exhaust manifold gas away from the turbine into said intercooler.

2. The engine of claim 1, wherein said intercooler comprises a heat exchanger having a tube bundle extending parallel to said cylinder axes intersection point.

3. The engine of claim 1, wherein said intercooler comprises parallel heat exchange tubes arranged so that each tube is parallel to said cylinder axes intersection point.

4. The engine of claim 1, wherein said exhaust gas recirculation valve comprises a valve cartridge partially embedded within said intake manifold.

5. The engine of claim 1, and further comprising an air inlet means on said intake manifold communicating with said turbine; and a gas admission passage means, connecting said intercooler to said air inlet means whereby recirculation gas is assimilated into the air stream flowing through said air inlet means.

6. The engine of claim 5, wherein said air inlet means comprises a venturi constructed to draw recirculation gas into the flowing air stream.

7. The engine of claim 6, wherein said venturi comprises a venturi cartridge partially embedded within said intake manifold.

8. The engine of claim 1, and further comprising a cylinder head overlying each bank of cylinders; said cylinder heads having upper flat surfaces located in a common plane; said intake manifold having flat lower mounting faces mated to the upper flat surfaces on said cylinder heads.

9. The engine of claim 8, and further comprising a set of valve-actuation rocker arms located above each cylinder head; said intake manifold having said extensions that form covers for said rocker arms.

10. The engine of claim 8, wherein each cylinder head has a set of air intake passages extending from its upper flat surface to the associated cylinders; said lower mounting faces on said air intake manifold having air admission openings aligned with said air intake passages.

11. The engine of claim 1, further including a thermostat housing integrated into the manifold.

12. The engine of claim 1, wherein heat from the intercooler is used to assist engine warm up for improved emission control.

13. The engine of claim 12, wherein engine is mounted into a vehicle having a cabin, and the heat from the intercooler is used to supplement vehicle cabin heating.

* * * * *

UNITED STATES PATENT AND TRADEMARK OFFICE
CERTIFICATE OF CORRECTION

PATENT NO. : 6,116,026
DATED : September 12, 2000
INVENTOR(S) : Charles E. Freese, V.

It is certified that error appears in the above-identified patent and that said Letters Patent is hereby corrected as shown below:

Page 1, column 1,
Line 5, after "BACKGROUND OF THE INVENTION", insert -- This invention was made with Government support under DE-FC05-97 OR22581 awarded by the United States Department of Energy. The Government has certain rights in this invention. --

Signed and Sealed this

Twenty-third Day of October, 2001

*Attest:*

*Attesting Officer*

NICHOLAS P. GODICI
*Acting Director of the United States Patent and Trademark Office*